UNITED STATES PATENT OFFICE.

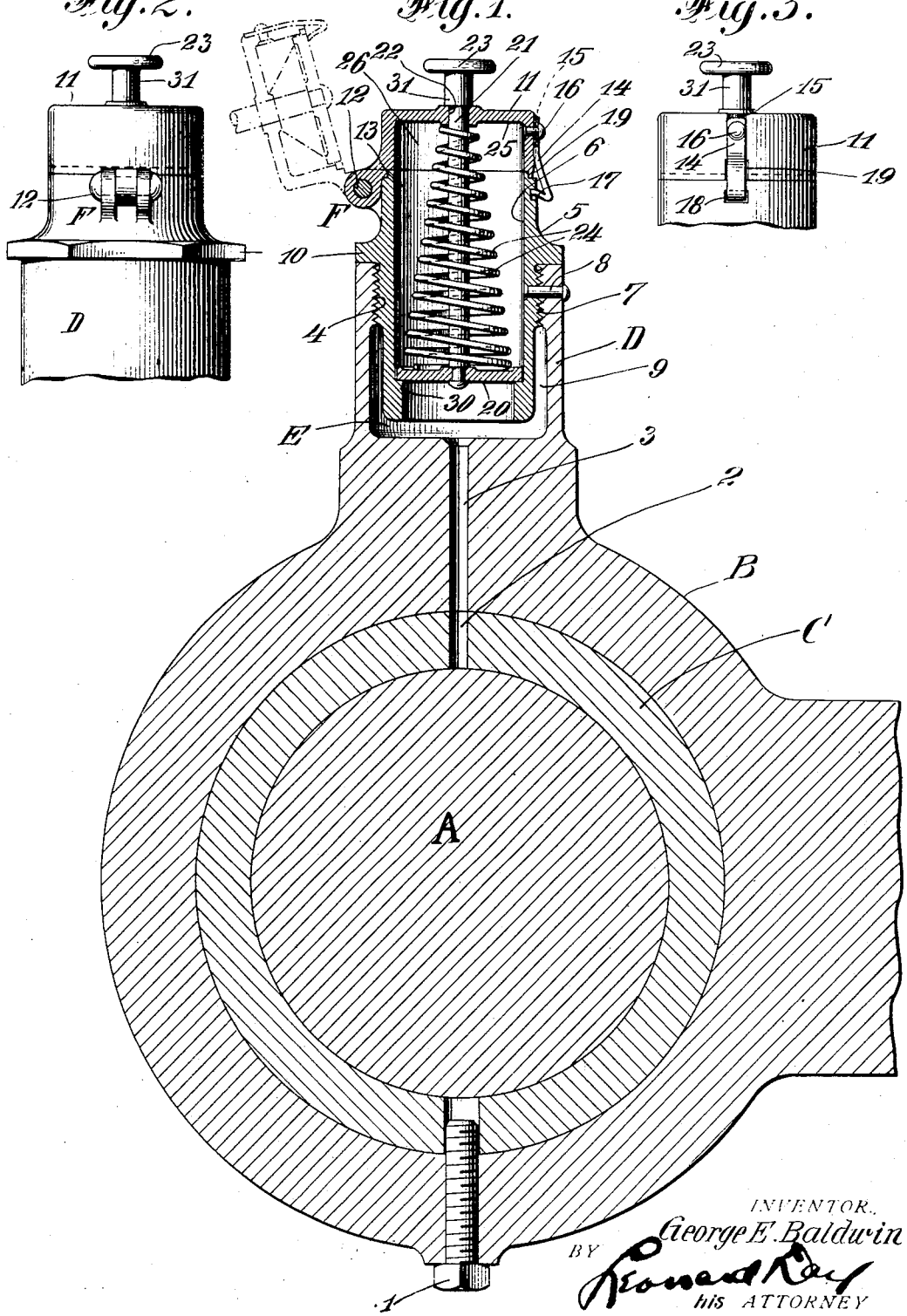

GEORGE E. BALDWIN, OF BRANFORD, CONNECTICUT.

GREASE-CUP.

1,273,806.

Specification of Letters Patent.  Patented July 30, 1918.

Application filed October 20, 1917. Serial No. 197,537.

*To all whom it may concern:*

Be it known that I, GEORGE E. BALDWIN, a citizen of the United States, and a resident of Branford, county of New Haven, and State of Connecticut, have invented certain new and useful Improvements in Grease-Cups, set forth in the following specification.

This invention relates to lubrication and particularly to the lubrication of journals in connecting rods for locomotives.

It is customary to provide a cup-shaped chamber in the bearing of a connecting rod, fill the same with grease, and screw into the cup-shaped chamber a threaded plug which forces the initial charge of the grease about the journal and then serves as a closure for the chamber. Much trouble is experienced with these bearings, particularly on account of the loss of the plugs due to the jars to which they are subjected and, in consequence, the loss of grease from the chamber, which is thrown out by centrifugal force. When a plug is lost the journal is also subject to the danger of the entrance of grit through the open lubricating chamber.

An object of my invention is to devise a grease-cup structure for coöperation with the standard bearing construction in locomotives which will overcome the above defects. More particularly I contemplate provision of a structure, all of the parts of which are anchored against removal from the bearing which will provide a cylinder for the reception of grease, a piston for forcing the grease to the journal through the medium of a spring, and an openable cap which closes the cylinder when the device is in operation but which may be opened for the purpose of filling and at the same time completely inclose the piston and spring to permit the same to clear the cylinder.

The above and further elements, both singly and in combination, of my invention will better be understood by reference to the illustrative embodiment described in the following specification and pointed out in the following claims, which are directed merely for purposes of illustration to the said embodiment, which is illustrated in the accompanying drawings forming a part hereof and in which like characters designate corresponding parts in the several figures. In the drawings Figure 1 is a vertical section through a journal bearing and a preferred embodiment of my invention, showing in dot and dash lines the cap open; Fig. 2 is a fractional vertical elevation viewing Fig. 1 from the left; and Fig. 3 is a fractional elevation viewing Fig. 1 from the right.

A indicates a locomotive journal in the connecting rod bearing B, while C indicates the usual interposed bronze bushing anchored by the anchor-bolt 1 and provided with a cross duct 2 communicating with the cross duct 3 in the bearing B. The bearing B is provided with an upstanding boss D having an internal cup-shaped chamber E and providing the internal screw threads 4 about its upper lips. The body 5 of the grease-cup F provides the operating cylinder 6, which is shown to be, geometrically speaking, of right cylindrical form, although it is to be understood that the expression "cylinder" in describing this operating member means merely that it is such a structure as will coöperate with a piston and need not, of necessity, have a circular cross-section. The body 5 has screw threads 7 adapted to thread into the threads 4 of the boss D, where a permanent anchorage is effected by means of the rivet 8 riveted through the lips of the boss D and the walls of the cylinder 6. The cylinder 6 extends down into the chamber E, preferably leaving a slight annular space 9 between the walls of the chamber E and the walls of the cylinder.

A flange 10, suitably faced off for the reception of a wrench is serviceable in seating the grease-cup.

A cap 11 is swiveled by the hinge 12 to the cylinder 6 and preferably is provided with the rabbet joint 13 to insure a dust-tight fit when the cap is held in place by the latch 14. The latch 14 is preferably secured to the cap 11 in a shallow channel 15 by the rivet 16. This catch 14 may conveniently be constructed of spring metal, the latch end 17 of which coöperates with notch 18 to hold the cap closed. The channel 15 has a deepened portion 19, the purposes of which will presently be described.

A piston 20 operatively works in the cylinder 6 and is guided by the stem 21, fixed to the piston and extending out through a central guide-way or hole 22 in the cap 11, where it preferably terminates in a handle 23. A compression spring 24 is interposed between the top wall 25 of the cap 11 and the piston 20, operatively tending to press the piston downwardly through the cylinder.

It is preferred that this spring be helically spiral so that it may be compressed a maximum amount into a pancake formation and so that the entire spring, together with the piston 20, may be inclosed within the pocket 26 of the cap 11 when the handle 23 is pulled all the way up. When thus inclosed in the pocket 26 the opening of the latch 14 permits the piston to be swung out of the cylinder and, together with the cap, be swung over to one side, as indicated in dot and dash lines in Fig. 1. When thus swung over the latch 14 snaps inwardly into the undercut portion 19 of the channel 15 so that its end 17 engages the piston to hold the spring under compression and the parts within the chamber 26 of the cap 11.

It is preferred that some means be provided to limit the operative movement of the piston 20. In the embodiment illustrated two means are shown. The flange 30, formed near the lower end of the piston 19, forms a piston stop, and likewise the shoulder 31 of the handle 23 forms a piston stop. In this manner a permanent minimum space demarked by the walls of the cup-shaped chamber and the nether face of the piston 20 is always provided.

When the grease cup is filled with grease the handle 23 projects a material distance above the cap and serves as a telltale that the piston is above its maximum depressed position. When the spring has forced the piston against a piston stop the downward position of the handle 23 is a telltale that the grease-cup should be filled. But even in this position a considerable reserve supply of grease is still present in the boss D, which may feed by gravity to prevent undue heating of the journal.

What is claimed and what is desired to be secured by United States Letters Patent is:—

1. In a grease-cup, an open ended cylinder having a piston-stop near one end; a piston working in said cylinder; a guide stem for said piston; a cap hinged to said cylinder and having a guide-way for said stem; a latch for securing said cap in closed position; and a spring interposed between the top of said cap and said piston and about said stem and tending to press said piston through said cylinder down to said piston-stop.

2. In combination in a journal and connecting rod bearing, an upstanding boss formed in said bearing having a cup-shaped chamber internally threaded at the top and communicating at the bottom with said journal; a cylinder having threaded engagement with said boss and extending into said chamber; a piston working in said cylinder; a cap hinged and latchable to said cylinder and having a central guide-hole; a spring between said cap and said piston; a guide-stem for said piston passing through said guide-hole and serving as a visible telltale for the position of said piston; and means for limiting the thrust of said piston by said spring to insure the maintenance of a material remaining space between the walls of said cup-shaped chamber and said piston after the full advance of said piston has been accomplished.

3. In a grease-cup, a cylinder having an opening at both ends; a cap having its top wall above the mouth of said cylinder to form a pocket within said cap, said cap being hinged and latchable to said cylinder; a piston working in said cylinder and having a guide-stem passing through said cap; and a compression spring between said piston and the top wall of said cap and capable, together with said piston, of being drawn by said stem completely within said cap and clear of the top opening of said cylinder.

4. A grease-cup comprising a cap providing an internal pocket and having a central guide-hole; a piston having a stem working through said guide-hole; a compression spring between said piston and cap; and a latch for releasably holding said piston when forced into said pocket against the compression of said spring.

In testimony whereof I have signed my name to this specification, this 5th day of October, 1917.

GEORGE E. BALDWIN.